US008589498B2

(12) United States Patent
Levy et al.

(10) Patent No.: US 8,589,498 B2
(45) Date of Patent: Nov. 19, 2013

(54) PHASE BASED PRIORITIZATION OF IMS SIGNALING MESSAGES FOR OVERLOAD THROTTLING

(75) Inventors: Noa Levy, Tel-Aviv (IL); Pesah Spector, Tzur-Igal (IL); Itai E. Zilbershtein, Hod-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 302 days.

(21) Appl. No.: 12/761,090

(22) Filed: Apr. 15, 2010

(65) Prior Publication Data
US 2011/0258261 A1 Oct. 20, 2011

(51) Int. Cl.
*G06F 15/16* (2006.01)
*H04L 12/58* (2006.01)
*H04L 29/06* (2006.01)

(52) U.S. Cl.
CPC ............. *H04L 12/585* (2013.01); *H04L 29/06* (2013.01)
USPC ........... 709/206; 709/207; 709/201; 709/203; 709/217; 709/218; 709/219; 709/220; 709/221; 709/222; 709/223; 709/224; 709/225; 709/226; 709/227; 709/228; 709/229; 709/235; 709/238; 709/239; 709/240; 709/241; 370/229; 370/230; 370/232; 370/233; 370/234; 370/237; 370/252; 370/331; 370/329; 370/338; 370/351; 370/352; 370/401

(58) Field of Classification Search
USPC ........ 709/206, 207, 225, 226, 227, 228, 229, 709/233, 234, 235, 238, 239, 240, 241, 201, 709/203, 217, 218, 219, 220, 221, 222, 223, 709/224; 370/229, 230, 232, 233, 234, 237, 370/252, 331, 329, 338, 351, 352, 401; 455/453, 414.1, 436, 432.1, 435.2, 455/435.3, 450, 451, 452.1, 452.2
See application file for complete search history.

(56) References Cited

U.S. PATENT DOCUMENTS

| | | | | |
|---|---|---|---|---|
| 4,532,625 | A * | 7/1985 | Stover | 370/225 |
| 7,079,857 | B2 * | 7/2006 | Maggenti et al. | 370/447 |
| 7,380,010 | B1 * | 5/2008 | Oran | 709/227 |
| 7,522,581 | B2 * | 4/2009 | Acharya et al. | 370/352 |
| 7,584,472 | B1 * | 9/2009 | McCormick et al. | 718/100 |
| 7,630,328 | B2 * | 12/2009 | Wright et al. | 370/260 |
| 7,941,175 | B1 * | 5/2011 | Hoff et al. | 455/527 |
| 7,958,233 | B2 * | 6/2011 | Fernandez Gutierrez | 709/224 |
| 8,050,259 | B2 * | 11/2011 | Bosch et al. | 370/389 |
| 8,116,782 | B2 * | 2/2012 | Yoshiuchi et al. | 455/452.2 |
| 8,199,640 | B2 * | 6/2012 | Burckart et al. | 370/229 |
| 8,270,588 | B2 * | 9/2012 | Schwartz | 379/210.02 |
| 8,423,658 | B2 * | 4/2013 | Shatsky | 709/231 |
| 2006/0223563 | A1 * | 10/2006 | Sung et al. | 455/518 |
| 2006/0230134 | A1 * | 10/2006 | Qian et al. | 709/224 |
| 2007/0005800 | A1 * | 1/2007 | Banks et al. | 709/238 |

(Continued)

OTHER PUBLICATIONS

Search Report for UK Patent Application No. GB1106365.8, dated Aug. 17, 2011.

*Primary Examiner* — Saket K Daftuar
(74) *Attorney, Agent, or Firm* — Sheridan Ross P.C.

(57) ABSTRACT

Systems and methods for providing overload protection in a communications system are provided. More particularly, an importance or priority rating of a message received at a communication server is determined. If the communications system is in an overload state, and if the importance rating of the received message is not sufficiently high, overload protection is applied. Overload protection can include denying service to a requested or in process communications system associated with the message.

19 Claims, 4 Drawing Sheets

(56) References Cited

U.S. PATENT DOCUMENTS

| | | | |
|---|---|---|---|
| 2007/0230369 A1* | 10/2007 | McAlpine | 370/256 |
| 2007/0230443 A1* | 10/2007 | Milstein et al. | 370/352 |
| 2007/0286361 A1* | 12/2007 | West et al. | 379/88.13 |
| 2007/0297401 A1* | 12/2007 | Bosch et al. | 370/389 |
| 2008/0225708 A1 | 9/2008 | Lange | |
| 2008/0239964 A1* | 10/2008 | Mitsutake | 370/237 |
| 2009/0029703 A1* | 1/2009 | Turnbull et al. | 455/436 |
| 2009/0232114 A1* | 9/2009 | Barave et al. | 370/338 |
| 2009/0310484 A1 | 12/2009 | Sisalem et al. | |
| 2010/0036953 A1* | 2/2010 | Bogovic et al. | 709/226 |
| 2010/0062787 A1* | 3/2010 | Yoshiuchi et al. | 455/452.2 |
| 2010/0067519 A1* | 3/2010 | Mang et al. | 370/352 |
| 2010/0083364 A1* | 4/2010 | Fernandez Gutierrez | 726/13 |
| 2010/0085959 A1* | 4/2010 | Vohra et al. | 370/352 |
| 2010/0107205 A1* | 4/2010 | Foti | 725/109 |
| 2010/0135190 A1* | 6/2010 | Park et al. | 370/260 |
| 2010/0303005 A1* | 12/2010 | Gossain et al. | 370/328 |
| 2011/0019650 A1* | 1/2011 | van Niekerk | 370/338 |
| 2011/0199963 A1* | 8/2011 | Shaw | 370/328 |
| 2011/0295943 A1* | 12/2011 | Peuziat et al. | 709/203 |
| 2012/0300767 A9* | 11/2012 | Ottur et al. | 370/352 |

* cited by examiner

PHASE BASED PRIORITIZATION OF IMS SIGNALING MESSAGES FOR OVERLOAD THROTTLING

FIELD

Methods and systems using prioritization of IMS signaling messages based on the phase of messages are provided.

BACKGROUND

Establishing a communication session in a modern Internet protocol (IP) based communication system typically involves the transmission, reception and processing of multiple signaling messages by multiple signaling entities. For example, in a session initiation protocol (SIP) network, establishing a session between two SIP endpoints A and B typically requires that an invite message be sent from endpoint A to server S1, which would either forward it, or create another SIP signaling message to either a server S2 or the endpoint B. S2 would have the same choice, potentially introducing server S3, or looping back to S1, etc. Communications systems typically employ recovery mechanisms such as selection of alternate routes, or indicating to users that the call cannot be completed.

The time it takes for the setup process to complete, either successfully or with the system notifying the user that it cannot provide the required service, has a significant impact on the usability and level of service the communications system offers to its users. The complex process of establishing a communications session can fail at any stage. Communications systems are often required to provide service to a very large number of users, and might be required to process thousands of sessions per second. As a result, a system can reach saturation conditions, in which resources are not available, degrading service to existing as well as new calls.

In order to address such overload conditions, a number of different approaches have been developed. For example, by preemptive deny/block actions taken as the communications system approaches a saturation level, the communications system can safeguard resources that may be required by existing calls. However, such overload mitigation mechanisms do not take into account the complex call flow involved in setting up sequenced SIP Internet Protocol multimedia subsystems (IMS) calls. In particular, such mechanisms ignore the relationship between the phase of the call setup and the impact on resource wastage and response time a drop or block decision might have.

In order to avoid or minimize such waste, methods have been developed for overload throttling that differentiate between different SIP messages within a SIP session. More particularly, a higher precedence may be given to SIP reply messages than is given to SIP invite messages. However, this approach assumes that a SIP session and a SIP call are one and the same, which is not the case in a sequenced application. Accordingly, such an approach can still result in significant waste of resources.

SUMMARY

The present disclosure is directed to providing methods and systems that solve these and other problems and disadvantages of the prior art. Specifically, methods and systems are provided that consider the phase of a communications message, such as a session initiation protocol (SIP) message, in determining the application of overload throttling. More specifically, the phase of different messages can be compared, and overload throttling can be applied to the message or messages that are associated with a less mature session. For example, an importance rating can be applied to a SIP message based on the phase of the call setup represented by that message. As a further example, a SIP message can be associated with an importance rating based on knowledge about the number of sequencing hops through features servers that a call is to take based on the participating parties.

Overload throttling as described herein can be performed as part of or at the direction of a module or application executed on a communication server. For example, the application or module operating as an ingress/egress module to a session manager system can operate to compare messages associated with different communications sessions, and to provide server busy indications in connection with SIP messages having a low priority or importance rating. This priority or importance rating can be derived from the phase of a message, or from the number of hops associated with the message.

Additional features and advantages of the present disclosure will become more readily apparent from the following description, particularly when taken together with the accompanying drawings.

DETAILED DESCRIPTION

Figure 1:
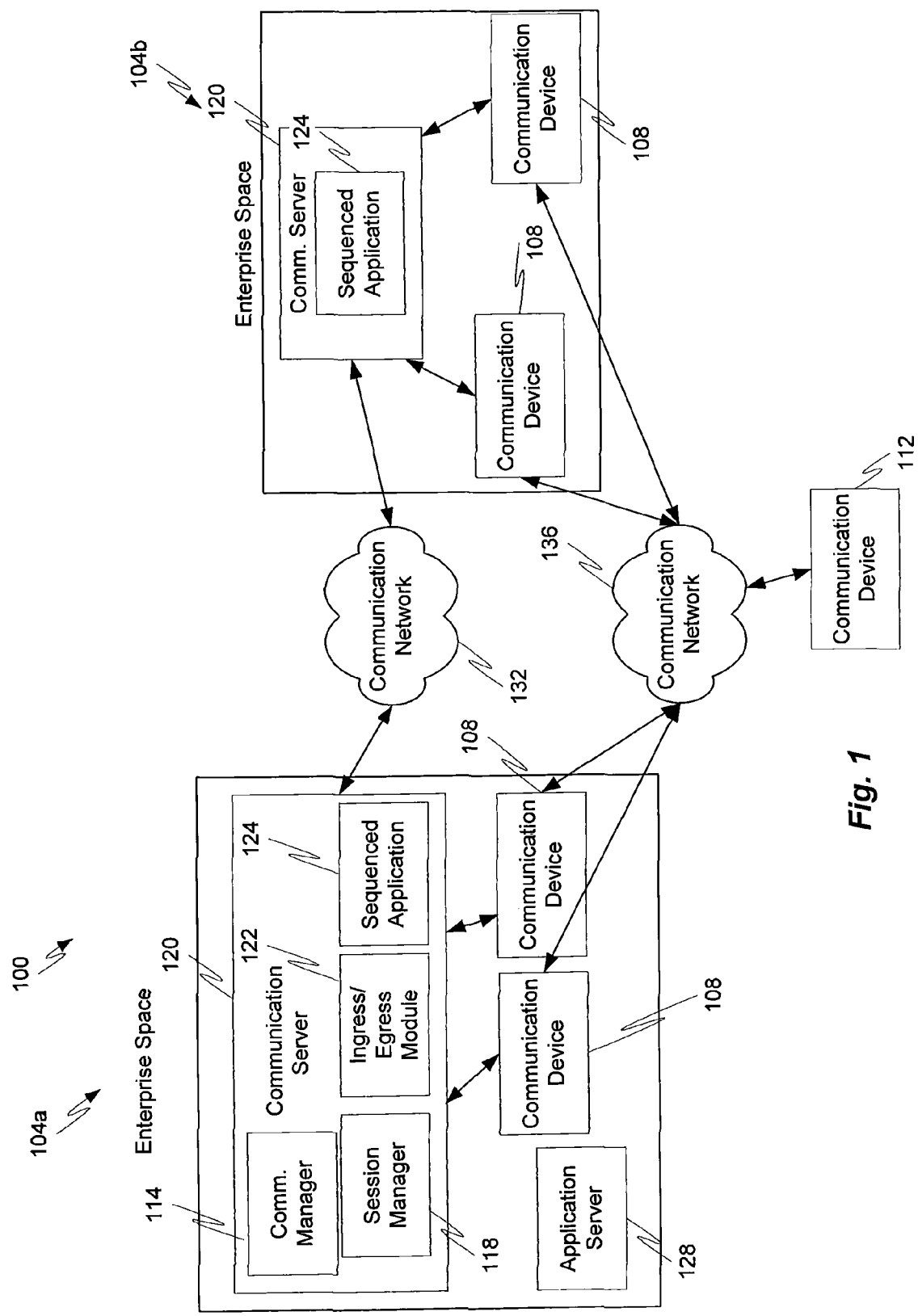
FIG. 1 is a block diagram depicting a communications system in accordance with at least some embodiments of the disclosed invention.

With reference initially to FIG. 1, an exemplary communications system 100 in connection with which overload throttling as described herein may be implemented is illustrated. More specifically, the communications system 100 may comprise a plurality of communication devices 108, 112 in communication with one another using a number of possibly different communication modalities. In some embodiments, the communications system 100 includes two or more domains or enterprises 104a, 104b, which are owned and operated by two different entities (e.g., two different companies, enterprises, etc.).

One or both enterprises 104a, 104b may comprise one or more communication devices or endpoints 108 which allow users in the enterprise to communicate with other users either within the enterprise or with users outside of the enterprise. In particular, the communication devices 108 may be connected to a communication network 136 which facilitates communications with other non-enterprise communication devices or endpoints 112. Moreover, the communication network 136 may interconnect communication devices 108 in different enterprise domains. The boundaries of the enterprise space 104a, 104b may be defined by network boundary devices, such as Session Border Controllers (SBCs), gateways, or the like.

In some embodiments, the enterprise space 104a, 104b may include dedicated communications equipment or devices, thereby creating a local communication network for the enterprise space 104a, 104b. In particular, the enterprise space 104a, 104b may include a Local Area Network (LAN), a Wide Area Network (WAN), a Session Initiation Protocol (SIP) network, or the like. The initiation and control of communications sessions, and provision of features for such sessions, may be controlled or assisted by the operation of a communication manager 114. The communication manager 114 may comprise a SIP server or SIP session manager, and may be included as part of a communication server 120.

A session manager 118 may also be included. As can be appreciated by on of skill in the art, the session manager can run on a dedicated communication server 120 or on a communication server 120 that also includes other applications or modules.

The communication server 120 may also feature an ingress/egress module 122. The ingress/egress module 122 can perform functions related to protecting the communication or session manager 114 node. For example, the ingress/egress module 122 can reject malformed SIP packets or other messages. In addition, the ingress/egress module 122 can determine or access information about the progress of a call setup process and intelligently drop calls or deny or discontinue service under overload conditions. More specifically, the ingress/egress module 122, as described in greater detail elsewhere herein, can determine the importance of a received SIP message, and determine whether to deny service to a communication session based on an importance rating of the received SIP message. As an alternative, the ingress/egress module 122 may be part of a separate communication server 120.

Sequenced applications 124 may run on or be executed by a separate server or servers on the communication server 120. As can be appreciated by one of skill in the art, a sequenced application 124 may be invoked or included in a call setup process as part of the features that are or will be provided in connection with a communications session. Alternatively or in addition, a sequenced application 124 can be executed by an application server 128 that is in communication with the communication server 120, either directly or via an intervening communication network. More particularly, the setup of the services or applications 124 can be performed as part of the initial negotiation of the communications session, during the communications session, or prior to the communications session to drive the application or applications 124 that will be launched.

In accordance with at least some embodiments of the present invention, and in response to or in association with communications between the communication devices 108, 112, a service or sequenced application 124 may be provided and made available to one or more of the communication devices 108, 112. In some embodiments, the sequenced application 124 may be provided on a server 120 maintained within the enterprise space 104a and/or 104b. In other embodiments, a sequenced application 124 may be provided on a server external to any particular enterprise 104a, 104b utilizing its services. In such an embodiment, a sequenced application 124 may be provided as Software as a Service (SaaS), as an application which leverages cloud computing, or any other software application made available to users on either a subscription basis or paid for according to use. Thus, a sequenced application 124 may be administered by a single enterprise for use by the enterprise communication devices 108 or may be administered by a service provider for use by multiple non-enterprise communication devices 112.

In some embodiments, a sequenced application 124 may be provided within a communication server, such as a Microsoft® Exchange Server, or as a thick client or routine for use by the server. In some embodiments, a sequenced application 124 may be made available for use via a web interface or the like. The format in which the sequenced application 124 is provided may vary depending upon system constraints and customer needs without departing from the scope of the present invention.

A sequenced application 124 may perform any of a variety of functions or services. Accordingly, a sequenced application 124 may access various repositories of data as necessary in completing the functions that it is to perform. For example, a sequenced application 124 may be capable of searching and retrieving relevant information from an identity database and/or a communication archive via a communication network 132 or 136. A communication network 132 used by a sequenced application 124 may be separate and distinct from the communication network 136.

As used herein, a communication network 132, 136 may comprise any type and any number of communication mediums and devices which are capable of supporting communication sessions, such as voice calls, video calls, chats, emails, chats, TTY calls, multimedia sessions, or the like. A communication network 132, 136 may include a LAN, a WAN, a SIP network, and any other type of packet-switched or circuit-switched network known in the art. In addition, it can be appreciated that a communication network 132, 136 need not be limited to any one network type, and instead may be comprised of a number of different networks and/or network types. A communication network 132, 136 may include an IP Multi-media Subsystem (IMS) network, an architectural SIP standard well known in the art, or any other type of network which provides access to one or more of the Internet, a standard Plain Old Telephone System (POTS), an Integrated Services Digital Network (ISDN), the Public Switched Telephone Network (PSTN), and any type of known cellular communication network. Accordingly, a communication network 132, 136 is equipped to facilitate communications between communication devices 108 and/or 112 via one or more communication media and/or modalities.

Figure 2:
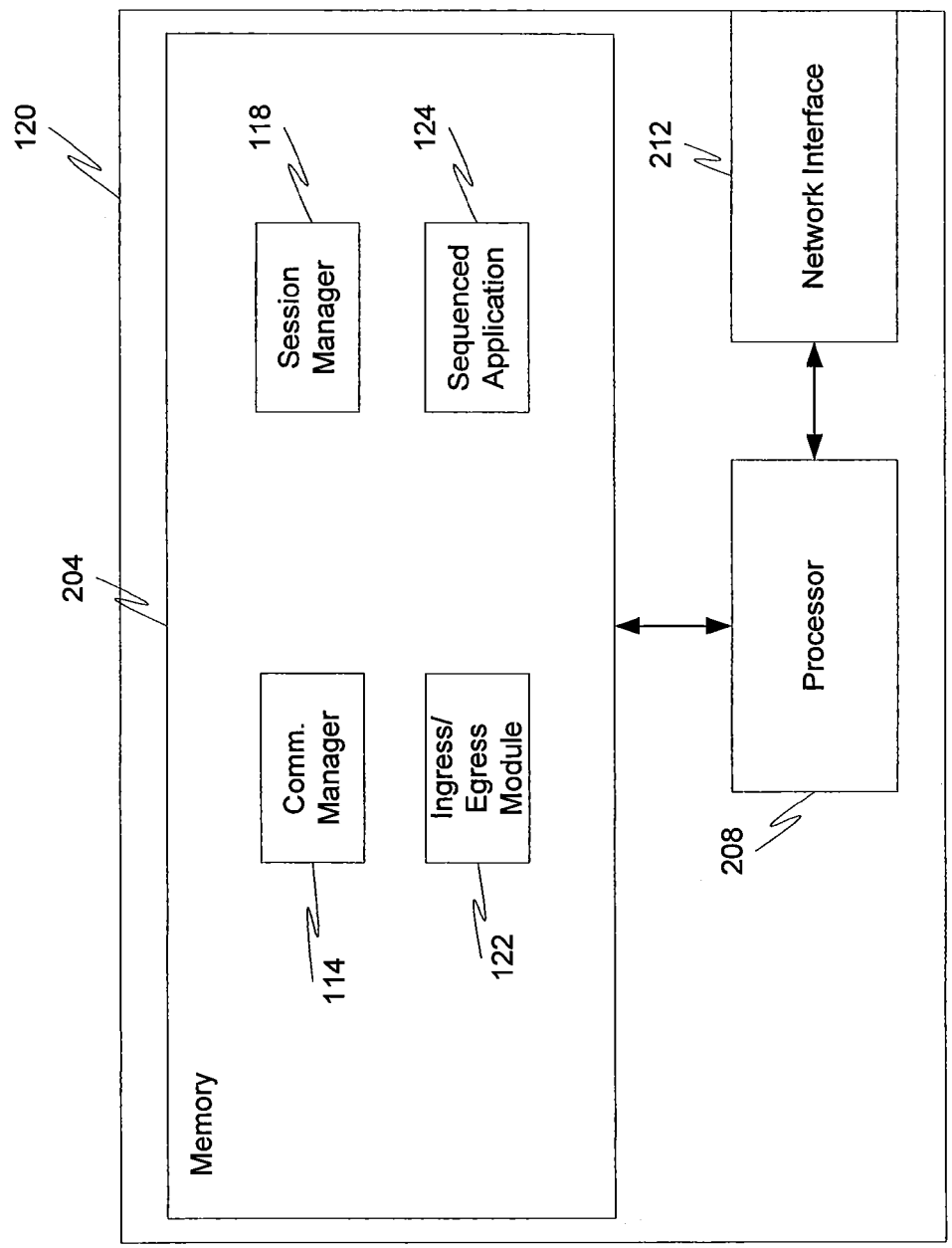
FIG. 2 is a block diagram depicting a communication server in accordance with embodiments of the disclosed invention.

With reference now to FIG. 2, additional details of a communication server 120 that includes an ingress/egress module 122 providing features for applying overload protection as described herein are illustrated. The ingress/egress module 122 may be provided as instructions in memory 204 that are executable by a processor 208 co-located or interconnected to the memory 204. Results of the execution of the ingress/egress module 122 may be shared with other applications or modules running on the communication server 120, or on an interconnected communication server 120 or application server 128. Moreover, results of the execution of the ingress/egress module 122 can be shared with other devices, nodes, applications or modules via the network interface 212 included in the communication server 120. Other applications or modules that may be provided as instructions in memory 204 that are executable by the processor 208 of the communication server 120 include the communication manager 114, session manager 118, and one or more sequenced applications 124.

The memory 204 included in the communication server 120 may be provided for use in connection with the execution of programming by the processor 208, and for the temporary or long term storage of program instructions and/or data, such as the ingress/egress module 122, the communication manager 114, the session manager 118, and/or the sequenced application or applications 124. Alternatively or in addition, data storage may be provided that is separate from the memory 204. The memory 204 may comprise a solid state memory device. Alternatively or in addition, the memory 204 may comprise a hard disk drive or other random access memory. In accordance with still other embodiments, the memory 204 may provide random access storage and/or read only storage. The communication server 120 processor 208 can include any general purpose programmable processor, digital signal processor (DSP) or controller for executing application programming. Alternatively, the processor 208 can comprise a specially configured application specific integrated circuit (ASIC). In accordance with still other embodiments, the ingress/egress module 122 may be implemented on a special card provided as part of the communication server 120 that includes its own memory, processor, and network interface.

The network interface 212 may comprise a communication modem, a communication port, a network interface, or any other type of device adapted to condition packets for transmission across a communication network 132, 136 to a destination communication device or node, as well as condition received packets for processing by the processor 208. Examples of network interfaces 212 include, without limitation, a network interface card, a modem, a wired telephony port, a serial or parallel data port, radio frequency broadcast transceiver, a USB port, or other wired or wireless communication network interfaces.

As can be appreciated by one of skill in the art, communications session messages can be used to establish a communications session and to involve system features and resources. These communications session messages can include invite and response messages, such as are used in implementing a SIP based communications system. Moreover, each module, application, or server that has received an invite message as part of the establishment or maintenance of a communications session will generally pass a response message back to a preceding device. The response message can be in the form of a message or signal indicating that the requested or indicated function has been initiated or completed. In accordance with embodiments of the present disclosure, the ingress/egress module 122 intercepts or is made aware of a communications session message associated with a communications session that the communications system 100 is establishing or handling. The communications session message, as described in greater detail elsewhere herein, is assigned an importance or priority rating by the ingress/egress module 122. The rating applied or associated with a particular communications session message can be dependent on the phase of the communications session or call setup that is represented by the message. As can be appreciated by one of skill in the art, multiple messages may be passed between multiple nodes within a communications system 100 in connection with establishing a communications session. For example, in a communications system 100 utilizing the session initiation protocol (SIP), a SIP INVITE message may be sent from an initiating communication device, such as communication device 108a. That SIP INVITE message is received at the ingress/egress module 122. In connection with the application of overload protection, the ingress/egress module 122 can assign a relatively low importance rating to the INVITE message. This low importance rating can be in recognition of the early phase of communications session establishment represented by the INVITE message. The ingress/egress module 122 can further recognize that the INVITE message is, more particularly, a call setup initiation message. Identification of the INVITE message as a call setup initiation message can be determined from an explicit tag included in the message, from the lack of an Internet Protocol multimedia subsystem (IMS) tag, from determining that the message was sent from an endpoint device such as 108 or 112, or from determining that the message has not been sent from a session manager 118. For a communications session at a more advanced stage, INVITE messages can be sent to feature servers, such as communication servers 120 and application servers 128, running sequenced applications 124 or otherwise providing features in support of or in association with a communications session, and to an endpoint device such as 108 or 112. In addition, response messages can be sent.

Figure 3:
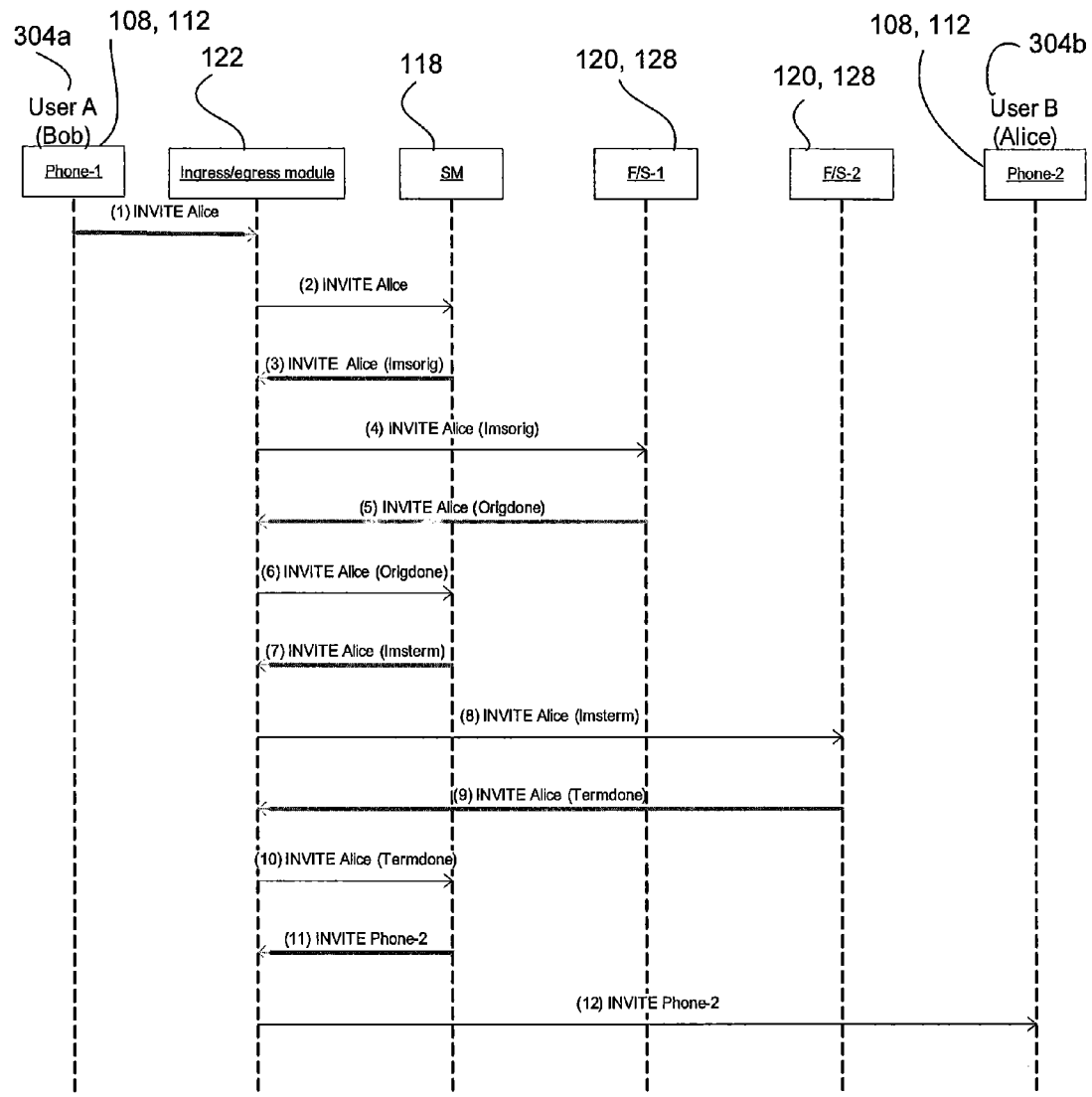
FIG. 3 is an example of a sequenced call flow in accordance with embodiments of the disclosed invention.

FIG. 3 illustrates an example sequenced call flow between user A 304a and user B 304b. More particularly, the communications session confirms SIP messages INVITE messages that may be sent in connection with establishing a communications session between user A 304a and user B 304b are illustrated. The first message is a first INVITE message from the communication device 108 or 112 associated with user A, that is sent to the ingress/egress module 122. In this example, the INVITE message is passed by the ingress/egress module 122 to the session manager 118. In response to receiving the INVITE message, the session manager 118 can respond with an INVITE "IMSorig" message. The ingress/egress module 122 can then forward the INVITE "IMSorig" message to a first feature server, such as a communication server 120 or application server 128 running a first application such as a first sequenced application 124. The feature server returns the INVITE message, with an "Origdone" tag to the ingress/egress module 122. Next, the ingress/egress module 122 provides the INVITE message with the IMS origdone tag to the session manager 118. The session manager 118 can then provide the INVITE e message, now with an "Imsterm" tag to the ingress/egress module 122. The ingress/egress module 122 can forward the INVITE message with the "Imsterm" tag to a second feature server that serves the endpoint associated with the called party. The second feature server can comprise a communication server 120 or application server 128 running one or more applications or sequenced applications 124. The second feature server can respond with an INVITE message that includes a "termdone" tag. The ingress/egress module 122 can then send the INVITE message, together with the "termdone" tag to the session manager 118. The session manager 118 can then send the INVITE message, now with an IMS tag identifying the communication endpoint of the called party to the ingress/egress module 122. The ingress/egress module 122 then forwards the INVITE message to that called party's communication device.

From the foregoing example, it can be appreciated that the ingress/egress module 122 receives six different INVITE messages as call setup is performed or sequenced through the feature servers and other components of the communications system 100. If the ingress/egress module 122 encounters an overload condition during this flow, throttling or overload protections can be applied, as described herein. If the ingress/egress module 122 does not deny service in connection with the first INVITE message 304, that first INVITE message 304 is allowed to pass to the session manager 118. The session manager 118 can then process the message normally. Processing the message can include forwarding the message to a communication manager function or application 114 as a second INVITE message. Alternatively, the session manager 118 can forward the message to a feature or other communication 120 or application 128 server for processing by a sequenced application 124. As yet another alternative, the communication manager 114 can forward the message to a sequenced application 124 as a forwarded INVITE message 312.

Each different message at different stages within a chain of messages can be associated with a different importance rating, based on the phase or stage of the associated communications session. Examples of importance ratings that can be applied, and the hints or indicators that can be applied in determining and assigning the importance rating, are set forth in Table 1. A table of importance ratings such as Table 1 may be implemented as part of the ingress/egress module. Alternatively or in addition, a table of importance ratings can be stored separately in memory 204, or in memory or data storage on another device or node, that is accessible to the ingress/egress module.

TABLE 1

Importance ratings

| # | Importance rating | Description | Message in FIG. 3 | Identification hints |
|---|---|---|---|---|
| 1 | 1 | Call setup initiation | INVITE (1) | No IMS tags, not sent from SM |
| 2 | 2 | Origination processing | INVITE (3) | Imsorig tag or Origination tag |
| 3 | 3 | Orig processing done | INVITE (5) | Origdone tag or Terminatinng |
| 4 | 4 | Termination Processing | INVITE (7) | Imsterm tag |
| 5 | 5 | Termination processing done | INVITE (9) | Termdone tag |
| 6 | 5 | Skip further sequencing, route to endpoint | NA | Endpoint tag |
| 7 | 6 | Message sent to destination | INVITE (11) | INVITE with no tags, sent from SM |

Figure 4:
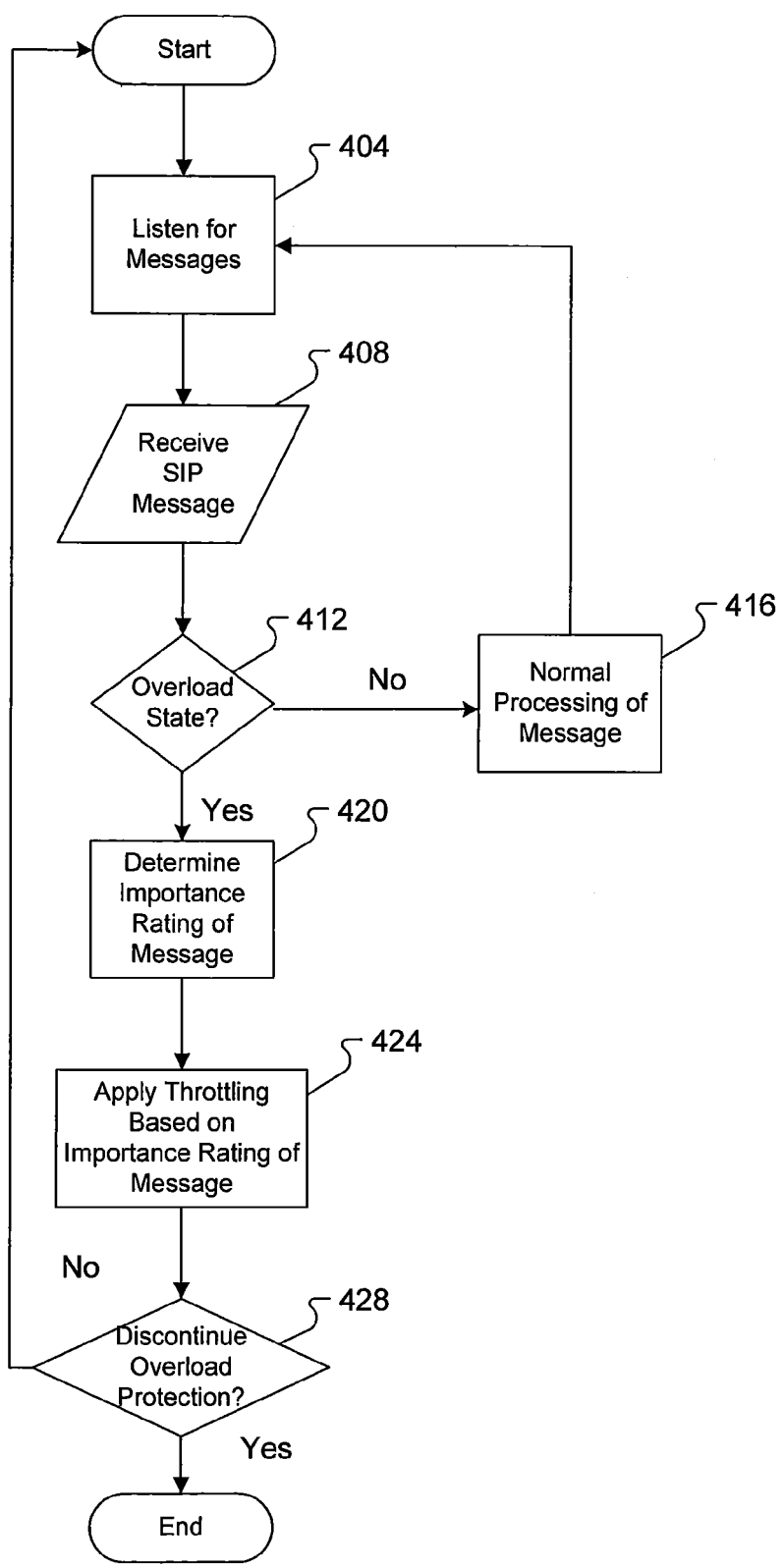
FIG. 4 is a flowchart illustrating aspects of the operation of a communications system providing overload throttling in accordance with embodiments of the disclosed invention.

Aspects of a method for implementing overload protection according to embodiments of the present disclosure are illustrated in FIG. 4. Initially, at step 404, the ingress/egress module 122 listens for messages. At step 408, a SIP message is received by the ingress/egress module 122. A determination is then made as to whether the communications system 100 is in an overload state (step 412). As can be appreciated by one of skill in the art, a communications system 100 may be in an overload state if resources associated with the communications system 100 are at or above a threshold level of capacity. For example, the communications system 100, for purposes of the operation of an ingress/egress module 122 associated with a first communication server 120, is in an overload state if that associated first communication server 120 is at or above a threshold level of capacity. As can be appreciated by one of skill in the art, additional or alternative measures for determining when a communications system 100 or components of that system are in an overload state can also be applied.

If the communications system 100 is not in an overload state, the message is processed normally (step 416), and the process returns to step 404 to listen for additional messages. If the communications system 100 is determined to be in an overload state, the importance rating of the call is determined based on the call setup phase (step 420). For example, the importance rating of the received message can be determined by applying or looking for the characteristics or hints associated with the message as set forth in the example of Table 1, or according to other or additional importance rating schemes. Throttling or overload protection is then applied based on the determined importance rating of the message (step 424).

At step 428, a determination can be made as to whether overload protection is to be discontinued. If overload protection is not to be discontinued, the process may return to step 404, where the ingress/egress module 122 continues to listen for messages. If overload protection is to be discontinued, the process may end.

Although the examples given in Table 1 all concern INVITE messages, alternative or expanded tables or schemes for assigning importance ratings can include entries for other messages. Therefore, although examples given above discuss call signaling in connection with the propagation of INVITE messages through components of a communication system 100, other communications messages can be considered for throttling. In particular, various SIP response messages can also be analyzed by the ingress/egress module 122 and considered for the application of throttling procedures. In addition, although examples of importance ratings are given to messages based on the phase of those messages, other criteria can be applied. For example, the importance of the communications session with which a particular SIP message is associated can be used to modify or determine the importance rating of the message. Other criteria that can be used to determine the importance of a particular message include metadata inserted in the message relating to the history of the packet or message. Examples of such meta information include the number of hops completed by the message, relative to the number of hops of other messages, or relative to the maximum number of hops possible in the communications system 100. In accordance with further embodiments of the present disclosure, the importance rating can be based on the amount of system resources that have been reserved or implicated in connection with the communications session that the message is associated with.

In accordance with still other embodiments, overload protection can be applied in connection with complex communications sessions that are comprised of several SIP sessions. In particular, overload protection can be applied to particular sessions depending on the relative importance of the different sessions. Therefore, overload protection may be applied in response to receipt of a message at an ingress/egress module 122, based on the importance of the communications session with which that message is associated.

The application of overload protections can include determining whether a message under consideration for denial of services has at least a threshold importance rating. According to such embodiments, if the subject message is not of a sufficiently high importance rating, throttling may be applied. In accordance with still other embodiments, when the communications system 100 is in an overload state, whether to apply throttling with respect to a particular message can be a decision that is based on a comparison between different messages associated with different communications sessions. Accordingly, overload protection may be applied in connection with a message that has a lower importance rating than another message received by the ingress/egress module 122 at about the same time. Where the importance ratings of a plurality of messages are compared, the comparison may be performed with respect to messages received at the ingress/egress module 122 within some finite time of one another (e.g., received within one second of each other).

The determination as to whether overload protection is to be applied to a particular message can also include the performance of a drop precedence calculation by the ingress/egress module 122. The drop precedence calculation, in addition or as an alternative to comparing importance ratings, can apply a weighting value to an importance rating, based on meta information related to the message or the associated communications session. In general, a communications session or call associated with a message determined to have the highest drop precedence of a number of current messages (i.e., the lowest importance rating) will be dropped before messages with lower drop precedence ratings (i.e., messages having a higher importance rating).

Although various functions, including assessing the importance rating of messages and determining whether a particular message is associated with a communications session that should be dropped in an overload state or condition, other components may perform these functions. For example, instead of a separate ingress/egress module 122, the functions performed by such a module in connection with overload protection as described herein can be performed by another application or module running on or in association with a communication server 120.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method of providing overload protection in a communication system, comprising:
    determining, in a communication server, whether a communication system overload condition is present in the communication system;
    determining, in the communication server, an importance rating of a first communication session message associated with the communication system, wherein the importance rating for the first communication session message is determined from a phase of the first communication session message in a first communication session, wherein the first communication session message is a Session Initiation Protocol (SIP) INVITE message, and wherein the phase of the first communication session message is determined based on at least two of: a SIP INVITE IMSorig message, a SIP INVITE with a Origdone tag, a SIP INVITE with an IMS origdone tag, a SIP INVITE with an Imsterm tag, a SIP INVITE with a termdone tag, and a SIP INVITE with an IMS tag; and
    in response to determining an overload condition and an importance rating for the first communication session message that is less than one of an importance rating of a second communication session message or a first threshold, the communication server applying a throttling procedure to the first communication session.

2. The method of claim 1, further comprising: providing an ingress/egress module; and providing the communication server, wherein the ingress/egress module is running on the communication server, wherein the ingress/egress module determines the importance rating of the first communication session message.

3. The method of claim 1, wherein the ingress/egress module applies the throttling procedure to the first communication session.

4. The method of claim 1, wherein the throttling procedure includes generating a service unavailable message.

5. The method of claim 1, further comprising:
    determining an importance rating of a second communication session message associated with the communication system; and
    comparing the importance rating of the first communication session message to the importance rating of the second communication session message, wherein the importance rating of the first communication session message is less than the importance rating of the second communication session message.

6. The method of claim 1, further comprising:
    determining an importance rating of a second communication session message associated with the communication system; and
    comparing the importance rating of the first communication session message and the importance rating of the second communication session message to a threshold importance rating, wherein the importance rating of the first communication session message is less than the threshold importance rating.

7. The method of claim 6, wherein neither the importance rating of the first communication session message nor the importance rating of the second communication session message is at least a threshold amount, and wherein an overload protection procedure is applied to the second communication session in addition to the first communication session.

8. The method of claim 1, further comprising:
    comparing the importance rating of the first communication session message to a threshold importance rating, wherein the importance rating of the first communication session message is less than the threshold importance rating.

9. A communication system, comprising:
    a first communication device;
    a first communication server, wherein the first communication device is interconnected to the first communication server;
    application programming running on at least one of the first communication server and a second communication server, wherein the application programming:
    determines whether a communication system overload condition is present in the communication system,
    determines an importance rating of a communication session message associated with the communication system, wherein the importance rating for the communication session message is determined from a phase of the communication session message in a communication session, wherein the communication session message is a Session Initiation Protocol (SIP) INVITE message and wherein the phase of the communication session message is determined based on at least two of: a SIP INVITE IMSorig message, a SIP INVITE with a Origdone tag, a SIP INVITE with an IMS origdone tag, a SIP INVITE with an Imsterm tag, a SIP INVITE with a termdone tag, and a SIP INVITE with an IMS tag, and
    in response to the application programming determining an overload condition and a first importance rating for the communication session message, the first communication server or the second communication server executes an overload procedure.

10. The system of claim 9, further comprising: a communication network; and, wherein the communication session message is provided to the first communication server by the communication network.

11. The system of claim 9, wherein the application programming includes a plurality of applications.

12. The system of claim 9, wherein the overload procedure is performed at least in part by the ingress/egress module, and wherein the overload procedure includes sending a service unavailable message to the first communication device.

13. A communication server, comprising:
    a network interface; memory; a processor; and application programming associated with the memory, wherein the application programming executed by the processor determines an importance rating of a first communication session message received by the application programming through the network interface, wherein the application programming executed by the processor determines an importance rating of a second communication session message received by the application programming through the network interface, wherein the application programming executed by the processor determines the importance ratings of the first and second communication session messages from a phase of the respective communication sessions messages, wherein at least the first communication session message is a Session Initiation Protocol (SIP) INVITE message and wherein the phase of the first communication session message is determined based on at least two of: a SIP INVITE IMSorig message, a SIP INVITE with a Origdone tag, a SIP INVITE with an IMS origdone tag, a SIP INVITE with an Imsterm tag, a SIP INVITE with a termdone tag, and a SIP INVITE with an IMS tag, wherein the application programming executed by the processor identifies the one of the first or second communication session messages having a lower importance rating, and wherein an overload procedure executed by the processor is applied in connection with the one of the first or second communication session messages having the lower importance rating.

14. The communication server of claim 13, wherein the overload procedure includes sending a service unavailable message to a first communication device interconnected to the communication server through a communication network interconnected to the network interface, and wherein the first communication device is associated with the one of the first or second communication session messages having the lower importance rating.

15. The communication server of claim 13, wherein the phase of the first communication session message is greater than the phase of the second communication session message, wherein the second communication session message has a lower importance rating than the first communication session message, and wherein the overload procedure is applied with respect to the communication session set up associated with the second communication session.

16. The communication server of claim 15, wherein the overload procedure includes terminating the communication session set up associated with the second communication session.

17. The communication server of claim 13, wherein the first and second communication session messages include session initiation protocol (SIP) messages, wherein the first and second communications session messages are part of first and second communications sessions respectively, and wherein the first and second communications sessions have different importance ratings.

18. The method of claim 1, wherein the phase of the communication is determined based on a number of hops completed by the first communication message relative to the number of hops completed by other messages.

19. The method of claim 1, wherein the phase of the communication is determined based on a number of hops completed by the first communication message relative to the number of hops possible in the communication system.

* * * * *